United States Patent [19]
Miller

[11] Patent Number: 4,684,153
[45] Date of Patent: Aug. 4, 1987

[54] EASY ACCESS SEAT BELT SYSTEM

[75] Inventor: Larry D. Miller, Rochester, Mich.

[73] Assignee: General Motors Corporation, Detroit, Mich.

[21] Appl. No.: 849,846

[22] Filed: Apr. 9, 1986

[51] Int. Cl.⁴ ............................................. B60R 21/10
[52] U.S. Cl. .................................... 280/808; 297/468; 297/483
[58] Field of Search ....................... 280/808, 801, 804; 297/468, 481, 483

[56] References Cited

U.S. PATENT DOCUMENTS

| | | | |
|---|---|---|---|
| 3,810,657 | 5/1974 | Campbell | 280/808 |
| 3,829,123 | 8/1974 | Holka | 280/808 |
| 3,907,329 | 9/1975 | Erion et al. | 280/808 |
| 4,060,260 | 11/1977 | Collins | 280/808 |
| 4,231,592 | 11/1980 | Scherenberg et al. | 280/808 |
| 4,235,456 | 11/1980 | Shakespear | 280/808 |
| 4,258,933 | 3/1981 | Takada | 280/808 |
| 4,291,898 | 9/1981 | Finn et al. | 280/808 |
| 4,315,640 | 2/1982 | Nakazato | 280/808 |
| 4,372,580 | 2/1983 | Motonami et al. | 280/808 |
| 4,405,155 | 9/1983 | Matsuoka | 280/808 |
| 4,465,302 | 8/1984 | Miki et al. | 280/804 |
| 4,531,762 | 6/1985 | Sasaki et al. | 280/808 |
| 4,548,425 | 11/1985 | Evans | 280/808 |
| 4,568,107 | 2/1986 | Biviano | 280/808 |

Primary Examiner—Richard A. Bertsch
Attorney, Agent, or Firm—Charles E. Leahy

[57] ABSTRACT

An improved belt system for the front seat of a coupe vehicle having a front seat back forwardly pivotable to enable occupant access to the rear seat through the door opening. The seat belt has a lap belt end anchored on the floor outboard the seat and a shoulder belt end anchored on the body rearward the door opening. A lap belt positioning sleeve is associated with the lap belt end and pivotally mounted on the body for movement between a forward position routing the belt across the occupant lap and a rearward position storing the belt horizontally along the floor. The shoulder belt positioning sleeve is associated with the shoulder belt end and pivotally mounted on the body rearwardly the door opening for movement between a forward position routing the belt across the upper torso and a rearward position disposing the shoulder belt vertically along the pillar rearwardly of the door opening. A push-pull cable interconnects the sleeves to pivot one of the sleeves to either its forward or rearward position automatically and simultaneously upon movement of the other sleeve to a selected position. A second push-pull cable interconnects one of the sleeves and the vehicle door to automatically move that positioning sleeve to the forward position when the door is closed and the rearward position when the door is open. Alternatively, the second push-pull cable may interconnect the sleeve and the seat back to pivot the sleeve in response to pivoting of the seat back.

6 Claims, 4 Drawing Figures

EASY ACCESS SEAT BELT SYSTEM

The invention relates to a seat belt system and more particularly to a front seat belt system for a two-door coupe vehicle and facilitates occupant ingress and egress to the rear seat and the donning of the front seat belt by the front seat occupant.

BACKGROUND OF THE INVENTION

It is well known in motor vehicles to provide a seat belt system comprised of a continuous length of belt including a lap belt end mounted on the vehicle floor outboard the seat and a shoulder belt end mounted on the body pillar which define the rear edge of the door opening.

In two-door coupe vehicles, the entry to the rear seat is obtained by tipping the front seat back forward and then stepping through the front door opening. In such two-door coupe type vehicles, the aforedescribed front seat belt system somewhat complicates access to the rear seat through the front door opening when the front seat back is tilted forwardly.

It is known in the prior art that the positioning of the lap belt end may be facilitated by enclosing the lowermost outboard lap belt end in a plastic sleeve which is pivotally mounted on the vehicle floor. The sleeve assumes a generally vertical and slightly forwardly tilted position when the seat belt is donned by the occupant. However, the sleeve can be pivoted downwardly and rearwardly to a generally horizontal position along the floor when it is desired to enter the rear seat so that the belt lies generally horizontally along the floor.

It is also well known in prior art seat belt systems to provide a shoulder belt sleeve pivotally mounted on the door pillar rearwardly of the door opening at an elevation above the occupant shoulder. The sleeve is associated with the shoulder belt and has a normal forward reaching position which conveniently disposes the shoulder belt across the occupant shoulder. This shoulder belt sleeve can be moved rearwardly about its pivot to a generally vertical position line alongside the pillar so that the shoulder belt portion of the belt is stored generally along the pillar and the door opening is cleared of any obstruction by the seat belt.

The aforedescribed seat belt positioning sleeves for the lap belt and the shoulder belt are manually pivoted to the desired positions by the vehicle occupant.

It would be desirable to provide some means for positioning the lap belt and shoulder belt sleeves at the desired position automatically and simultaneously.

SUMMARY OF THE INVENTION

The present invention provides an improved belt system for the front seat of a coupe vehicle having a front seat back forwardly pivotable to enable occupant access to the rear seat through the door opening. The seat belt has a lap belt end anchored on the floor outboard the seat and a shoulder belt end anchored on the body pillar rearward the door opening. A lap belt positioning sleeve is associated with the lap belt end and pivotally mounted on the body for movement between a forward position routing the belt across the occupant lap and a rearward position disposing the belt horizontally along the floor. The shoulder positioning sleeve is associated with the shoulder belt end and pivotally mounted on the body rearwardly of the door opening for movement between a forward position routing the belt across the upper torso and a rearward position disposing the shoulder belt vertically along the pillar rearwardly of the door opening. A push-pull cable is provided in interconnection between the sleeves to pivotally move one of the sleeves to either its forward or rearward position automatically and simultaneously upon movement of the other sleeve to a selected position. A second push-pull cable may be provided in interconnection between one of the sleeves and the vehicle door to automatically move that positioning sleeve to the forward position when the door is closed and the rearward position when the door is open. Alternatively, the second push-pull cable may be provided with an interconnection between one of the sleeves and the seat back so that the sleeve will be pivoted to the forward position when the seat back is in the normal upright seat forming position and pivoted rearwardly to the stored position when the seat back is pivoted forwardly to enable occupant access to the rear seat.

Accordingly, the object, features and advantages of the invention reside in the provision of seat belt positioning sleeves associated with the lap belt end and shoulder belt end of the seat belt and interconnected with one another by push-pull cable or other interconnecting means to automatically and simultaneously effect movement of both ends of the seat belt to either the use position or stored position automatically upon movement of either of the ends to that position.

A further feature, object and advantage of the invention resides in the provision of seat belt positioning sleeves associated with the lap belt end and shoulder belt ends of the belt and interconnected with one another and with the vehicle door to automatically move the belt ends to the use position when the door is closed and automatically move the belt ends to the stored position facilitating occupant ingress when the door is opened.

Still further features, objects, and advantages of the invention resides in the provision of seat belt positioning sleeves associated with the lap belt end and shoulder belt ends of the belt and interconnected with one another and with the front seat back to automatically move the belt ends to the use position and when the seat back is in the normal rearward seat forming position and automatically move the belt ends to the stored position facilitating occupant ingress when the seat back is tilted forwardly to permit occupant ingress and egress from the rear seat.

Still further features, objects, and advantages of the invention will become apparent upon consideration of the description of the preferred embodiment, and the appended drawings in which.

DESCRIPTION OF THE PREFERRED EMBODIMENT

Figure 1:
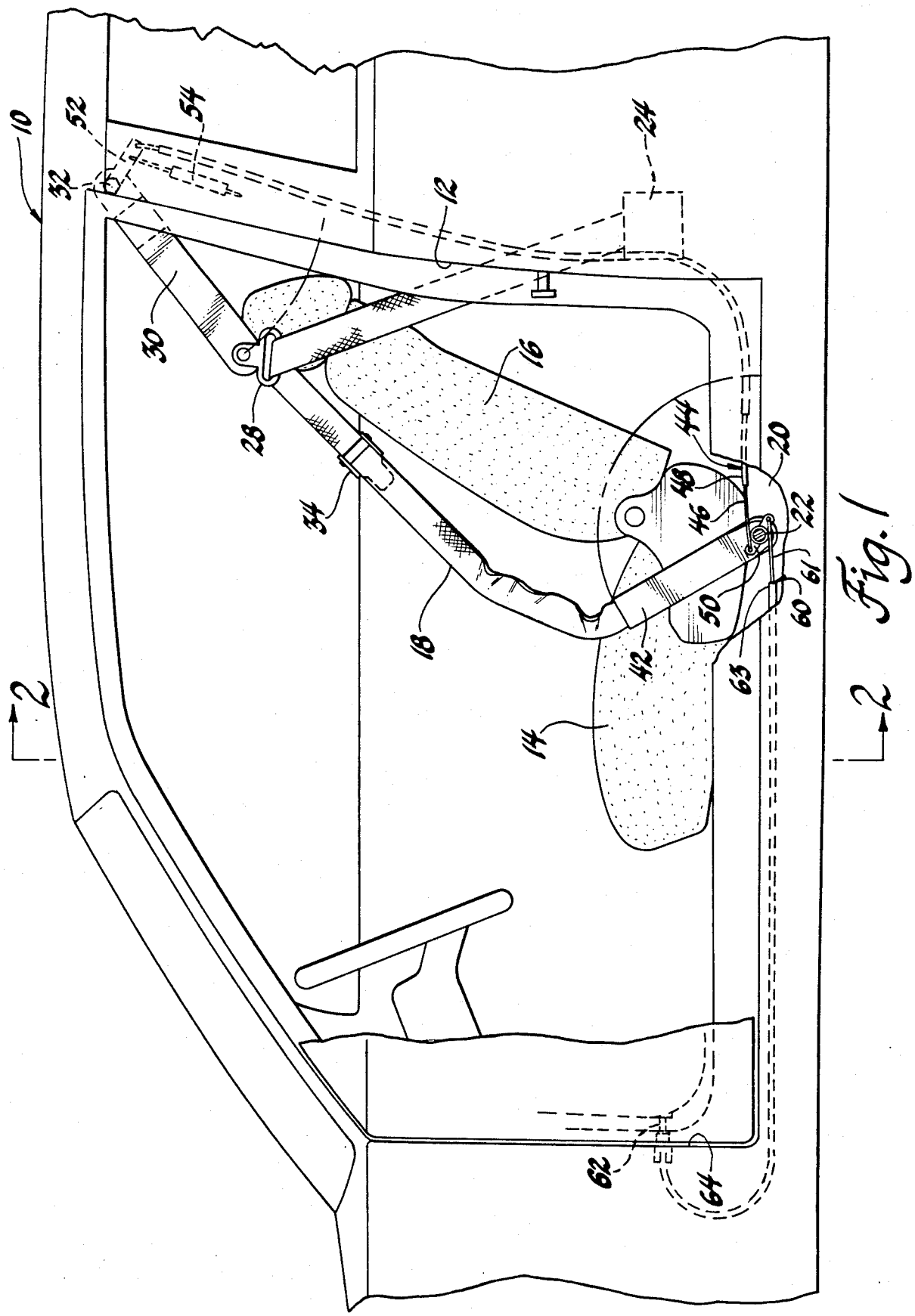
FIG. 1 is a side elevation view showing a vehicle body having an easy access seat belt system according to the invention and with parts broken away and in section.

Referring to FIG. 1, there is shown a vehicle body 10 of the two door coupe type having a door opening 12 adjacent the front seat 14. The seat 14 includes a seat back 16 which is mounted for forward tilting movement to the position of FIG. 3 enabling occupant access through the door opening 12 into the rear seat, not shown.

Figure 2:
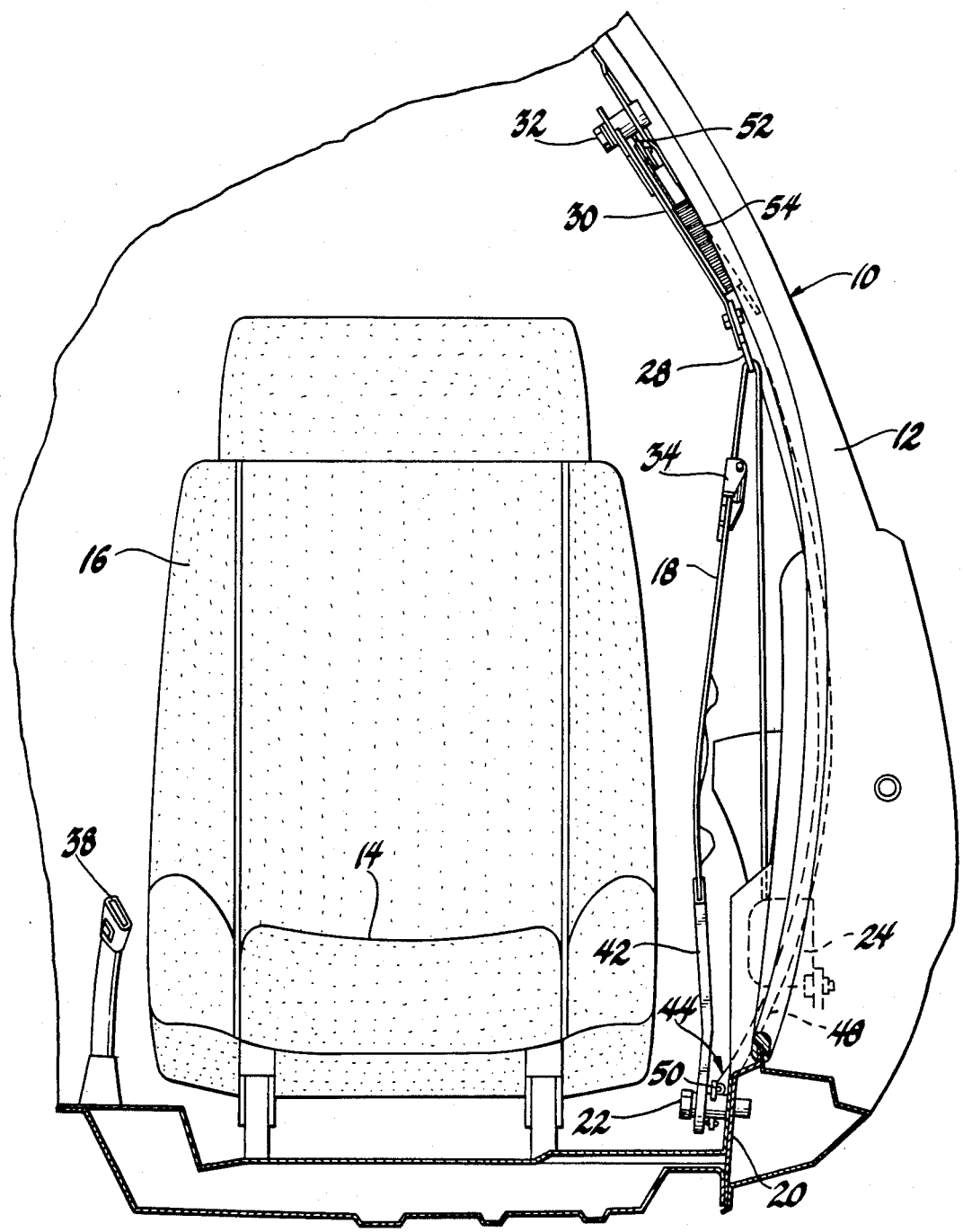
FIG. 2 is a sectional view taken in the direction of arrows 2—2 of FIG. 1 showing a frontal elevation view of the seat belt system.

The seat belt system for the front seat occupant includes a continuous length of seat belt 18 having a lower end attached to the vehicle body sill structure 20 by a pivot bolt 22. The other end of the seat belt 18 is retractably mounted on the vehicle body by a conventional seat belt retractor 24 which is mounted on the body pillar just rearwardly of the door opening 12 and at a desired elevation. A central portion of the seat belt 18 passes slidably through a guide loop 28 which is pivotally mounted on the end of a shoulder belt positioning sleeve 30. The shoulder positioning sleeve 30 is pivotally mounted on the vehicle body near the juncture of the pillar and the roof rail by a pivot bolt 32. The pivot bolt 32 mounts the shoulder belt positioning sleeve 30 for pivotable movement between the position of FIG. 1 and the position of FIG. 3. As shown in FIG. 1, the forward position of the shoulder belt sleeve 30 positions the guide loop 28 generally adjacent the shoulder of a seated occupant so that the seat belt 18 is disposed for diagonal deployment across the occupant shoulder and upper torso and for buckling of a latch plate 34, carried on the belt 18, with a seat belt buckle 38 suitably mounted on the vehicle body inboard the seat 14, as best seen in FIG. 2.

The lap belt end of the seat belt 18 is enclosed within a plastic positioning sleeve 42. The positioning sleeve 42 is pivotally mounted on the body sill structure 20 by the pivot bolt 22 and is movable between the forward position of FIG. 1 disposing the lap belt across the occupant lap and the rearward position of FIG. 3 in which the positioning sleeve 42 lies horizontally against the floor to position the lap belt portion of the belt horizontally along the floor.

As best seen in FIG. 1, a push-pull cable assembly 44, comprised of a cable 46 and a sheath 48, extends between the shoulder belt positioning and sleeve 30 and lap belt positioning sleeve 42. In particular, as best seen in FIG. 1, an end of cable 46 is attached to a lever 50 carried by the lap belt positioning sleeve 42. Similarly, the other end of the cable 46 is attached to a lever 52 attached to the shoulder belt positioning sleeve 30. Accordingly, it will be understood that the length of the cable 46 will determine the relative pivotal positions of the shoulder belt positioning sleeve 30 and the lap belt positioning sleeve 42 and the length is selected so that the shoulder belt positioning sleeve 30 and the lap belt positioning sleeve 42 are simultaneously positioned in the FIG. 1 position in which the front seat occupant may don the seat belt by pulling on the belt 18 to buckle the latch plate 34 into the buckle 38 as permitted by unwinding of the belt 18 from the retractor 24. A coil tension spring 54 acts between the lever 52 and the pillar to normally position the shoulder belt positioning sleeve 30 at its forward position of FIG. 1.

Figure 3:
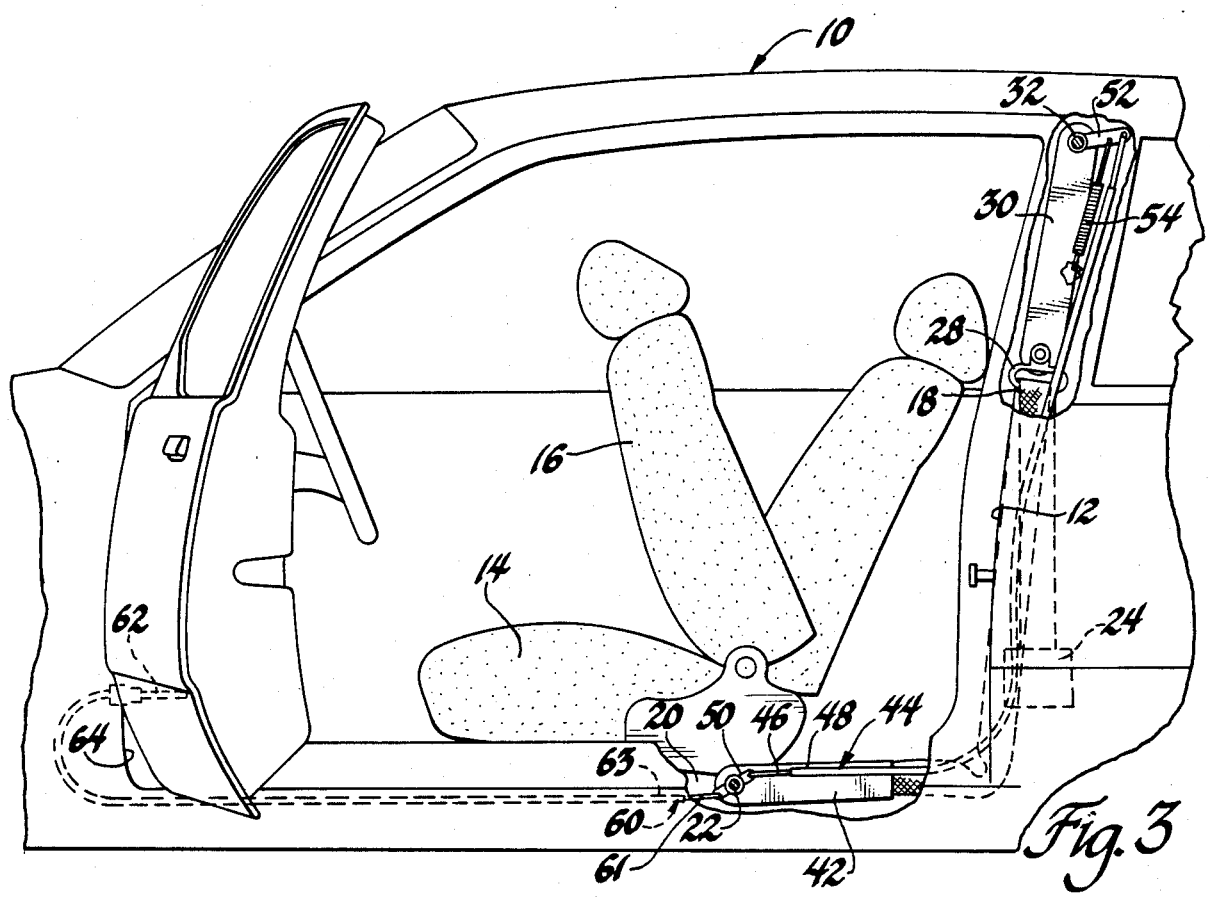
FIG. 3 is a view similar to FIG. 1, but showing the seat belts moved to a stored position in response to opening movement of the door to facilitate occupant ingress and egress to the rear seat.

Referring to FIG. 1, it will be understood that occupant entry into the rear seat is obtained by tilting the seat back 16 forwardly to the FIG. 3 position. In order to clear the seat belt system from any obstruction of the door opening 12, the vehicle occupant may grip either the shoulder belt positioning sleeve 30 or the lap belt positioning sleeve 42 and pivot that positioning sleeve to the FIG. 3 position. Simultaneously, the interconnection provided by the push-pull cable 44 will function to pivot the other belt positioning sleeve to its FIG. 3 position. Accordingly, it will be understood that the shoulder belt portion of the seat belt is stored vertically along the pillar rearwardly of the door opening 12 while the lap belt portion of the belt 18 extends horizontally along the floor. In this way the entire belt system is located either rearwardly or generally below the door opening 12 so that the occupant is permitted easy access to the rear seat. When the seat back 16 is returned to the normal rearward position, the front seat occupant may grip either the shoulder belt positioning sleeve 30 or the lap belt positioning sleeve 42, at his choice, and pivot the sleeve forwardly while the push-pull cable will automatically return the other sleeve to its corresponding forwardly pivoted position of FIG. 1.

Referring again to FIG. 1, it is seen that a second push-pull cable assembly 60 including a cable 61 and sheath 63 extends along the sill structure 20 and has one end connected to the end of the lever 50 opposite from its connection with the cable 46, and a second end which extends forwardly to the leading edge of the front door opening. A spring-loaded plunger 62 is mounted on the hinge pillar 64 and is spring loaded to project therefrom as shown in FIG. 3 as permitted by opening movement of the door. Normally, however, the door is closed and the spring loaded plunger 62 is retracted to the FIG. 1 position which pushes the cable 61 and establishes the lap belt positioning sleeve 42 at its occupant restraining position of FIG. 1. When the vehicle door is moved to the open position of FIG. 3, the spring loaded plunger 62 pulls on the cable 61 and in so doing pivots the lap belt positioning sleeve 42 rearward to the FIG. 3 position while the push-pull cable 46 simultaneously functions to move the shoulder belt positioning sleeve 30 to its rearward FIG. 3 position. Thus, it will be appreciated that when the door is moved to the open position, the seat belt system will automatically be moved to its stored position of FIG. 3 in readiness for the entry of an occupant into the rear seat. When the door is closed, the seat belt system, including both the lap belt and the shoulder belt portions thereof, will be returned to the forward position of FIG. 1 in readiness for the front seat occupant to don the seat belt.

Figure 4:
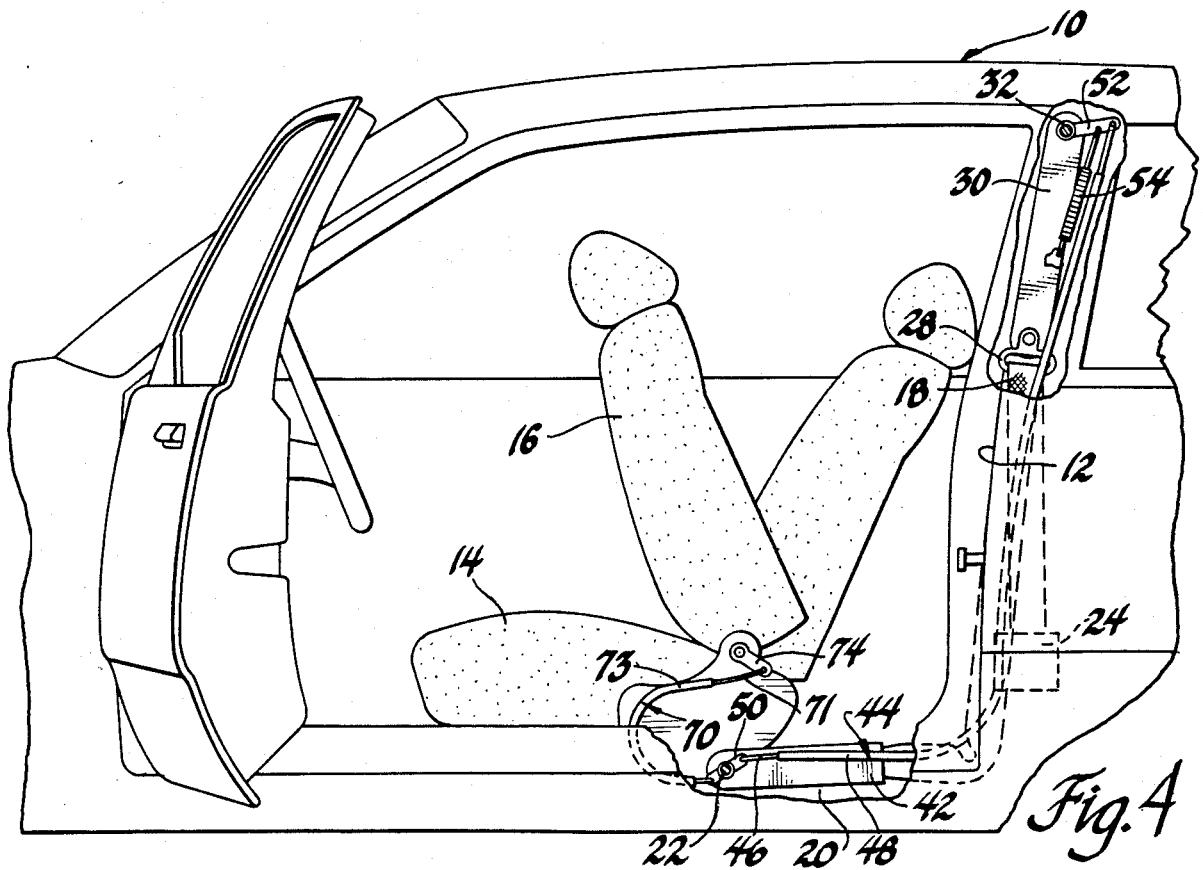
FIG. 4 is a view similar to FIG. 3 but showing a second embodiment of the invention in which the seat belts are moved to the stored position by forward tilting movement of the seat back.

Referring to FIG. 4, it is seen that an alternative to the interconnection of the lap belt sleeve 42 with the door is an interconnection of the lap belt sleeve 42 with the seat. More particularly, a push-pull cable 70, including a cable 71 and sheath 73, is provided. One end of the cable 71 is connected to the lever 50 associated with the lap belt positioning sleeve 42 and the other end of the cable 71 is connected to a lever 74 associated with the seat back 16. When the seat belt back is pivoted forwardly, as shown in FIG. 4, to permit occupant entry to the rear seat, the cable 71 is pulled and, acting through the lever 50, pivots the seat belt positioning sleeve 42 rearwardly to the stored position of FIG. 4. Later, a return of the seat back to the rearward position will push the cable 71 to pivot the lap belt positioning sleeve 42 forwardly to again re-establish the seat belt at the FIG. 1 position for donning by the seat occupant.

Although the preferred embodiment of FIGS. 1-3 is shown herein with the interconnection between the door and the lap belt positioning sleeve 42 routed through the sill structure 20, it will be appreciated that the push-pull cable 60 could alternatively extend up through the windshield pillar and connect with the shoulder belt positioning sleeve 30.

Furthermore, it will be understood that the seat belt system hereof may be interconnected with both the front door, as shown in FIGS. 1-3, and with the seat back as shown in FIG. 4. In such a system, the opening of the front door would unblock the spring-loaded plunger 62 for extension into the space previously occupied by the front door. However, the normal rearward position of the seat back would act through the cable 71 to maintain the lap belt positioning sleeve 42 at the normal forward use position and thus the cable 61 would prevent the spring loaded plunger from extending. Thus, the seat belt system would remain in the normal FIG. 1 use position even when the door is opened. Then, if and when the seat back 16 is tilted forwardly to the position of FIG. 4, the seat belt positioning sleeves 30 and 42 will be simultaneously pivoted rearwardly to the stored position.

Thus, it is seen that the invention provides a new and improved easy access seat belt system which facilitates access to the rear seat of a coupe vehicle by simultaneously and automatically moving both the lap belt and shoulder belt portions of the seat belt between a normal forward use position and a rearward position minimizing obstruction of access to the rear seat.

The embodiments of the invention in which an exclusive property or privilege is claimed are defined as follows:

1. A seat belt system for the front seat of a coupe vehicle having the front seat back forwardly pivotable to enable occupant ingress and egress to the rear seat through the door opening comprising:

a seat belt having a lap belt end anchored on the floor outboard the seat and a shoulder belt end anchored on the body rearward the door opening;

a lap belt positioning sleeve associated with the lap belt end and pivotally mounted on the body for movement between a forward position routing the belt across the occupant lap and a rearward position lying horizontally along the floor to dispose the lap belt at a position facilitating occupant ingress and egress;

a shoulder belt positioning sleeve associated with the shoulder belt end and pivotally mounted on the body for movement between a forward position routing the belt across the occupant upper torso and a rearward position lying vertically rearwardly of the door opening to dispose the shoulder belt at a position facilitating occupant ingress and egress;

and means independent of the seat belt interconnecting the sleeves and adapted to coordinate the pivotal movement therebetween such that movement of either of the sleeves to a selected one of the forward or rearward positions thereof will effect simultaneous movement of the other of the sleeves to the selected position.

2. A seat belt system for the front seat of a coupe vehicle having the front seat back forwardly pivotable to enable occupant ingress and egress to the rear seat through the door opening comprising:

a seat belt having a lap belt end anchored on the floor outboard the seat and a shoulder belt end anchored on the body rearward the door opening;

a lap belt positioning sleeve associated with the lap belt end and pivotally mounted on the body for movement between a forward position routing the belt across the occupant lap and a rearward position lying horizontally along the floor to dispose the lap belt at a position facilitating occupant ingress and egress;

a shoulder belt positioning sleeve associated with the shoulder belt end and pivotally mounted on the body for movement between a forward position routing the belt across the occupant upper torso and a rearward position lying vertically rearwardly of the door opening to dispose the shoulder belt at a position facilitating occupant ingress and egress;

and a push-pull cable independent of the seat belt having one end connected to the lap belt positioning sleeve and the other end connected to the shoulder belt positioning sleeve, said push-pull cable coordinating the pivotal movement between the sleeves such that movement of either of the sleeves to a selected one of the forward or rearward positions thereof will effect simultaneous movement of the other of the sleeves to the selected position whereby occupant ingress and egress to the rear seat by a rear seat occupant and donning of the front seat belt by a front seat occupant is facilitated.

3. A seat belt system for the front seat of a coupe vehicle having the front seat back forwardly pivotable to enable occupant ingress and egress to the rear seat through the door opening comprising:

a seat belt having a lap belt end anchored on the floor outboard the seat and a shoulder belt end anchored on the roof rearward the door opening;

a lap belt positioning sleeve associated with the lap belt end and pivotally mounted on the body for movement between a forward position routing the belt across the occupant lap and a rearward position lying horizontally along the floor generally below the door opening to dispose the lap belt at a position facilitating occupant ingress and egress;

a shoulder belt positioning sleeve associated with the shoulder belt end and pivotally mounted on the body for movement between a forward position routing the belt across the occupant upper torso and a rearward position lying vertically rearward of the door opening to dispose the shoulder belt generally rearwardly of the door opening to facilitate occupant ingress and egress;

first means interconnecting one of the sleeves with the door in a manner to pivot that sleeve to the forward position when the door is moved to the closed position and pivot that sleeve to the rearward position when the door is moved to the opened position;

and second means independent of the seat belt interconnecting the sleeves and adapted to coordinate the pivotal movement therebetween such that movement of the one sleeve to either the forward or rearward positions thereof in response to movement of the door automatically effects simultaneous movement of the other of the sleeves to the corresponding position whereby occupant ingress and egress to the rear seat by a rear seat occupant and donning of the front seat belt by a front seat occupant is facilitated.

4. The combination of claim 3 further characterized by said first and second interconnecting means comprising push-pull cables acting respectively between the door and the one sleeve and between the two sleeves.

5. A seat belt system for the front seat of a coupe vehicle having the front seat back forwardly pivotable to enable occupant ingress and egress to the rear seat through the door opening comprising:

a seat belt having a lap belt end anchored on the floor outboard the seat and a shoulder belt end anchored on the roof rearward the door opening;

a lap belt positioning sleeve associated with the lap belt end and pivotally mounted on the body for movement between a forward position routing the belt across the occupant lap and a rearward position lying horizontally along the floor generally below the door opening to dispose the lap belt at a position facilitating occupant ingress and egress;

a shoulder belt positioning sleeve associated with the shoulder belt end and pivotally mounted on the body for movement between a forward position routing the belt across the occupant upper torso and a rearward position lying vertically rearwardly of the door opening to dispose the shoulder belt generally rearwardly of the door opening to facilitate occupant ingress and egress;

first means interconnecting one of the sleeves with the seat back in a manner to pivot that sleeve to the forward position when the seat back is moved to the normal seating position and pivot that sleeve to the rearward position when the seat back is moved forwardly to permit access to the rear seat;

and second means independent of the seat belt interconnecting the sleeves and adapted to coordinate the pivotal movement therebetween such that movement of the one sleeve to either the forward or rearward positions thereof in response to movement of the seat back automatically effects simultaneous movement of the other of the sleeves to the same position whereby occupant ingress and egress to the rear seat by a rear seat occupant and donning of the front seat belt by a front seat occupant is facilitated.

6. The combination of claim 5 further characterized by said first and second interconnecting means comprising push-pull cables acting respectively between the seat back and the one sleeve and between the two sleeves.

* * * * *